US010588201B2

(12) United States Patent
Schröder et al.

(10) Patent No.: US 10,588,201 B2
(45) Date of Patent: *Mar. 10, 2020

(54) CONTROL MODULE FOR CONTROLLING A LIGHT, PARTICULARLY A STREET LIGHT, AND NETWORK OF LIGHTS

(71) Applicant: SCHREDER, Brussels (BE)

(72) Inventors: Helmut Schröder, Wiesbaden (DE); Daniel Brand, Köln (DE); Didier Wellens, Kraainem (BE)

(73) Assignee: SCHREDER, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 15/525,261

(22) PCT Filed: Nov. 10, 2015

(86) PCT No.: PCT/EP2015/076161
§ 371 (c)(1),
(2) Date: May 8, 2017

(87) PCT Pub. No.: WO2016/075116
PCT Pub. Date: May 19, 2016

(65) Prior Publication Data
US 2018/0288854 A1 Oct. 4, 2018

(30) Foreign Application Priority Data
Nov. 10, 2014 (EP) .................... 14192578

(51) Int. Cl.
H05B 37/02 (2006.01)
H04B 10/11 (2013.01)
(Continued)

(52) U.S. Cl.
CPC ......... H05B 37/0272 (2013.01); H04B 10/11 (2013.01); H05B 37/0227 (2013.01); H04W 84/042 (2013.01); H04W 84/12 (2013.01)

(58) Field of Classification Search
CPC . H05B 37/0272; H04W 84/042; H04W 84/12
See application file for complete search history.

(56) References Cited

U.S. PATENT DOCUMENTS

2007/0109142 A1*  5/2007  McCollough, Jr. .... G08B 21/12
                                                                340/641
2009/0167204 A1    7/2009  Beij et al.
(Continued)

FOREIGN PATENT DOCUMENTS

DE    102004039677 A1    12/2005
WO    2012/082655        6/2012
WO    2015000803 A1      1/2015

OTHER PUBLICATIONS

Cimcon Software India, "LightingGale—Remotely Monitor and Control Street Lights" http://www.cimconautomation.com/power/street_light_cm.htm (Jan. 2009).
(Continued)

Primary Examiner — Thuy V Tran
(74) Attorney, Agent, or Firm — Browdy and Neimark, P.L.L.C.

(57) ABSTRACT

Described herein is control module for a street light which is mounted on the street light and provides a control output for controlling the operation of the light. The control module has a circuit board (38) on which a controller (39) is mounted, the controller being connected a long-distance communication module, a short-distance communication module, and a geocoordinate module. A network is formed by the control modules in which a central server uses long-distance communication for communicating with the control modules at start up and with a group controller after start up, the group controller using short-distance communication for communicating with control modules within its group.

17 Claims, 7 Drawing Sheets

Figure 1:
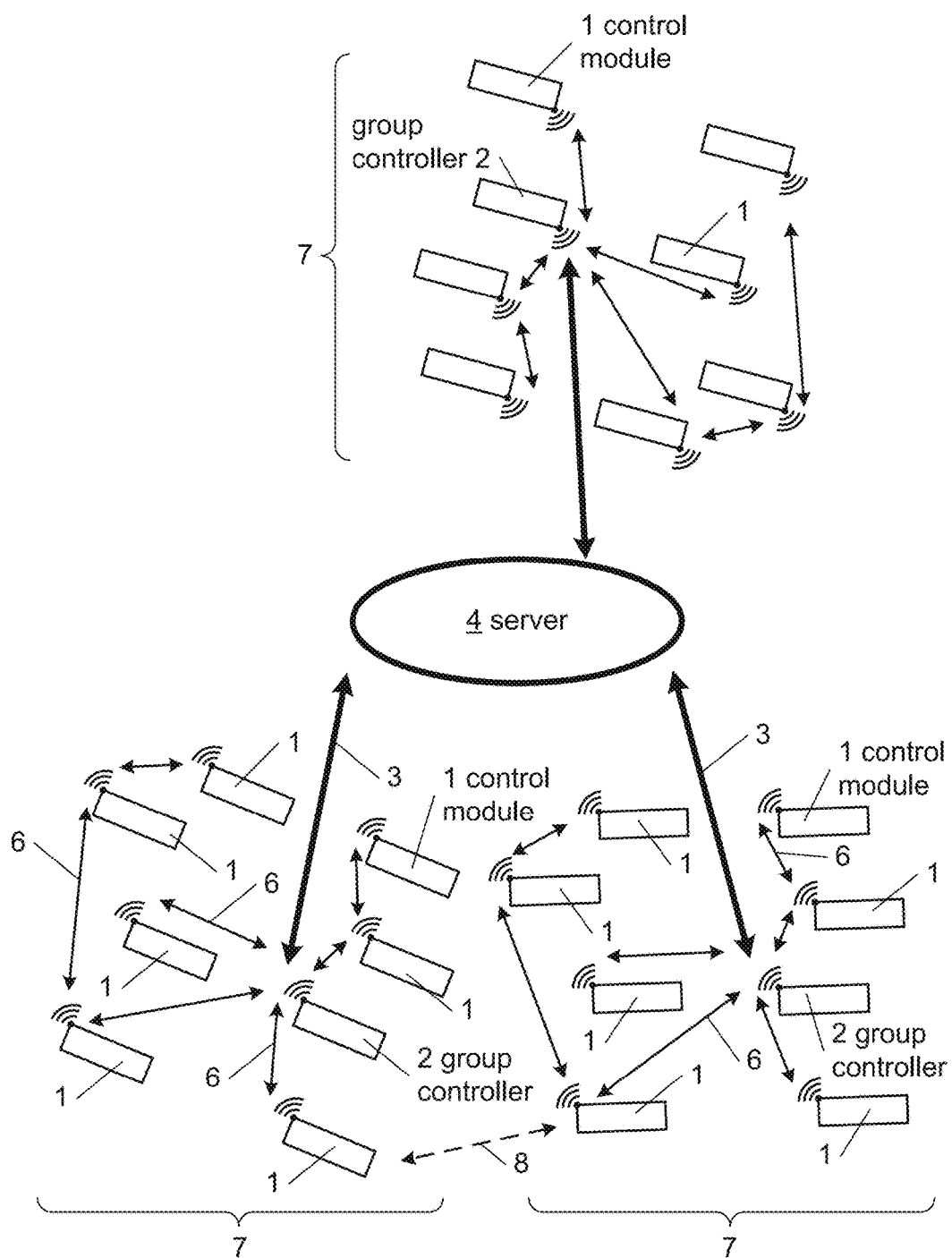

(51) Int. Cl.
*H04W 84/12* (2009.01)
*H04W 84/04* (2009.01)

(56) References Cited

U.S. PATENT DOCUMENTS

| | | | |
|---|---|---|---|
| 2012/0147604 A1 | 6/2012 | Farmer | |
| 2012/0286770 A1* | 11/2012 | Schroder | H05B 37/0272 |
| | | | 324/113 |
| 2012/0299509 A1 | 11/2012 | Lee et al. | |
| 2013/0057158 A1* | 3/2013 | Josefowicz | G01S 19/14 |
| | | | 315/152 |
| 2013/0057181 A1 | 3/2013 | Bernard et al. | |
| 2013/0088153 A1 | 4/2013 | Lagutko | |
| 2014/0239808 A1* | 8/2014 | Nava | H05B 37/0218 |
| | | | 315/82 |
| 2014/0368116 A1* | 12/2014 | Walters | H05B 37/0272 |
| | | | 315/152 |
| 2015/0127251 A1* | 5/2015 | Chen | G01C 21/206 |
| | | | 701/487 |

OTHER PUBLICATIONS

Cimcon, "Cimcon Lighting Announces GPS Support for Its Wireless Outdoor Lighting Controllers", Cimcon Lighting, Inc., http://www.cimconlighting.com/03112014.htm, (Mar. 2014).

* cited by examiner

CONTROL MODULE FOR CONTROLLING A LIGHT, PARTICULARLY A STREET LIGHT, AND NETWORK OF LIGHTS

This invention refers to a control module for controlling a light (i.e a luminaire), particularly street light, and a network of lights.

It is known form the state of the art that networks of lights are equipped with increasingly intelligent control systems. For instance, networks of lights can be operated by telemanagement systems, in which a device known as segment controller, which is connected to a management console on a PC, controls a number of lights via their control module. The segment controller, which is too large to be integrated into a light, must be set up such that the lights to be controlled can communicate with the controller via a short-distance communication module. A failure of the segment controller leads to a control failure of the light network.

There is also the method of equipping all light control modules of the network to be controlled with a long-distance communication module, for instance a GSM-based module, which the control modules use to communicate with a central server. Due to the large number of control modules actively integrated into a provider or long-distance communication network, relevant communication expenses arise when this network is used.

Furthermore, the commissioning/start-up of these known systems is costly, as particularly the GPS-supported allocation of the controller to a light must be carried out manually. Finally, the latency in the network is comparatively high due to the large number of lights controllable by a segment controller.

The invention described herein aims to create a control module for operating a light network, which is easier to start up, guarantees improved system stability (of the network) and is furthermore cheaper to operate.

The task is solved by an object described in claim 1, an object described in claim 14 and an object described in claim 17.

According to this invention, the control module for controlling the light, particularly a light designed as a street light, is to be equipped with a long-distance communication module, a short-distance communication module, a geocoordinate module, a controller, preferably at least one sensor, as well as a control output to control an exciter of the light, with the long-distance communication module being able to reach a server and with the control module being designed to transmit environmental, light and/or control module information to the server.

Here, environmental information shall be understood as information registered by environmental sensors. For instance, these may be sensors for identifying or detecting approaching objects, e.g. vehicles. In particular, however, this information consists of geocoordinates, registered by the geocoordinate module. To determine the position of the control module modules based on GPS, GLONASS, Galileo, BeiDou or other in particular satellite based positioning systems could be used. At the same time, the module is not necessarily to be understood as a separate unit. For instance, it may also consist of a unit of the control module, that sits on the same circuit board, on which the controller is located. The control module may, for instance, be used as a separate assembly unit or as an integral part of a light.

Transmission of the geocoordinates and possibly other control module or light-specific information enables a server of the telemanagement system to create a detailed image of the installed control modules and then divide the installed control modules into groups on the basis of control strategies to be determined or pre-determined on the server.

Within the allocated groups, communication with the group controller then takes place via the short-distance communication module. The group controller is the only module in the group capable of exchanging data with the server via the long-distance communication module. The long-distance communication module can be based on different network techniques. These could be a cellular network, an IP-network or a long range peer to peer network.

For replacement purposes, the server can determine another group controller to take over communication with the server if the first group controller fails. The control modules of the group may be informed of the replacement group controller in advance or it may be re-allocated to them in case of a failure.

Particularly for registering light-specific information, it is beneficial for a control module according to this invention to be equipped with a near field communication module, in particular comprising a near-field sensor. Preferably this module should comprise an RFID reader capable of reading out information saved by the light. This information will then also be transmitted to the server via the group controller. Through this process, installation of the control module becomes significantly faster than if light-specific information has to be registered and transmitted separately by a technician. At the same time, the system becomes more fail-safe.

In order to be able to read out an information medium located within the light head in case of the control module being primarily located on the outside, the control module can consist of two parts. The first part is then to be located on the outside of the light head, while the second part is to be located on the inside. Depending on the design of the control module, the external part may be purely an antenna component serving for short- and long-distance communication. As an alternative, the internal component within the light housing may consist of only a low number of control module elements, for instance the RFID reader described above.

To guarantee problem-free communication within the group, the short-distance communication modules may be multiplex-capable and able to communicate on different frequencies, especially for communication via the same antenna. In this manner, an environment scan available within established standards, e.g. the ZigBee standard, can be separated from the usual control module communication with the group controller by its frequency, so adjacent groups in different communication states do not interfere with each other.

Furthermore, the installation personnel can carry out installation of a control module according to this invention faster, if the control module is factory-provided with log-in information for a network provider, particularly an internationally active provider (roaming access) of a cellular network. This makes it possible for information to be transmitted to the server immediately after voltage is applied and potentially after the first installation of a control module. The server can then, for instance, provide local log-in data for a local cellular network, which can, for example, be carried out by transmitting a firmware to an electronic SIM on the control module.

The at least one sensor can preferably be a brightness sensor, so that in case of a fail-safe state without contact to a server, at least operation of the light according to the brightness level is possible. Particularly for detection of seismic waves, the sensor may, however, also be an acceleration sensor or a seismometer, with a network of sensors and the detection of vibration events registered by potentially inaccurate acceleration sensors located in the entire network nevertheless enabling a sufficiently detailed analysis and determination of earthquake waves.

This invention allows for the equipment of control modules with a multitude of sensors. For instance, in addition to a brightness sensor there may be an acceleration sensor for detecting vibration events and/or an infra red sensor for detecting approaching objects, e.g. vehicles or pedestrians.

If it is a seismometer, the sensor may also be located at a different point within the light from the rest of the control module. For instance, it may be located in the foot of a street light.

The task described at the beginning is also solved with the advantages described above and below by a light, particularly a street light, with this light being equipped with a corresponding control module.

Preferably an RFID transponder with light-specific data is installed in or on the light head for registration of light-specific data. It may be read out by a control module with an RFID reader. Instead of an RFID transponder, it may also be another data medium, which can preferably be read out without being touched.

A network consisting of the control modules described above or below comprises a multitude of lights equipped with one control module each, as well as one server, with the network containing one or multiple groups preferably of up to 200, preferably up to 50 lights or lights, with each light or light being equipped with a control module as described above or below, and with each group having a control module specified as its group controller, released for communication with the server via the long-distance communication module, while the remaining control modules are designed for indirect communication with the server via the group controller and with each other and with the group controller for communication via the short-distance communication module.

For installation of the network, the control modules are divided into one or more groups of control modules by a server, with this division being based on information provided by the control modules concerning the environment, lights and/or control modules.

As environmental information, in addition to geocoordinates, information regarding adjacent control modules in the short-distance network (e.g. connection quality and/or other RF characteristics and/or neighbourhood tables) and/or environment-specific information (e.g. light intensity in the surroundings) may be taken into consideration. The information concerning the lights may be information regarding the illuminants used, their drivers and/or further details of the allocated light, e.g. the current light intensity or dimming. The control module information is particularly information used for clear identification of the control module, such as its IP address or another UID (Unique IDentifier).

According to this invention, the server selects one control module per group, or in case of a single group of the group, as group controller. The other control modules of the corresponding group use their short-distance communication modules to communicate with this controller. This means communication within a group uses the corresponding short-distance communication modules. Within the group, the control modules of the group form a short-distance network via their corresponding short-distance communication modules, preferably a mesh network. During normal operation of the network, the group controller can only transmit its own environmental, light and/or control module information and the information received from its other control modules to the server via the long-distance communication module. For this purpose, normal operation is understood as the usual operation of the network, in which each control module of the network is allocated to a group and in which all control modules carry out their actual task, controlling the light. For both, the methods described above and below, transmission of information is always executed through transmission of the corresponding data on the basis of specific communication protocols.

A network set-up like this leads to a more stable operation than previous network systems. Due to the redundant set-up of the respective control modules within a group, a new group controller can easily be determined by the server in case of a group controller failure. Once the new group controller has been announced within a group, i.e. on the level of the short-distance communication network (PAN=Personal Area Network), the other control modules not defined as group controllers establish their connections via the group controller. This means that the server can continue to control and monitor the system. At the same time, the single active control module (group controller) per group makes expenses significantly lower than in a network where all control modules communicate separately with the server via their respective long-distance module.

The set-up of the internal group network as mesh network makes the system and communication on the PAN level more fail-safe.

If "with" is used above or below to explain process steps, this does not necessarily mean that the connected process steps are simultaneous. Rather, these process steps may (but do not have to) be simultaneous.

The commissioning/start-up of the network is furthermore made easier if the network automatically records geo-information, particularly during initial commissioning/start-up, preferably when voltage is first applied, as it then carries out this process automatically after a control module is switched on. This geo-information consists of location data, i.e. coordinates and a precise time stamp The geo-information is registered by means of the geocoordinate module. At the same time or subsequently, the long-distance communication module logs in with a network provider. Preferably this should be a provider of communication lines, e.g. a phone and data line provider. This log-in can take place under roaming conditions, which means that, regardless of where the respective control modules are to be set up at a later time, the factory must always only provide identical log-in information. Therefore, the controller and/or long-distance communication module have consistent log-in data on the control module side.

After log-in with the network provider, the geo-information can then be transmitted to the server together with information regarding the control module and/or lights. The automatic storage of the data in a corresponding database by the server facilitates uncomplicated set-up of street lights. To reduce communication costs, provider access data specific to an existing long-distance network can be transmitted to a control module after the control module's information has been transmitted.

In particular, the provider access data can be provided via firmware to those control modules equipped with an electronic SIM. In this case, the new firmware is transferred to the controller or the long-distance communication module, so that commissioning/start-up of the new control module becomes possible at low cost and under local conditions. At the same time, provision of firmware by the server can achieve flexible communication and installation of the corresponding control modules without them having to be equipped differently by the factory.

A server in this case is not necessarily a separate data processing system with separate hardware. It can also merely be a project-specific separation within a telemanagement program. It may also be a virtual server on the same hardware or within a cloud.

To facilitate problem-free operation, the project server could preferably be provided with information about the commissioned devices by the log-in server after the initial log-in.

To lower costs, an interface from the server to the long-distance network provider or the network provider should preferably be used to transfer information regarding the control modules active within their long distance communication, to be suspended and/or to be made inactive. This means that the provider guarantees that only a low number of control modules (one control module per group) is active. The other control modules can only communicate with the server via the communication path within the mesh network and then via the group controller. A suspension, especially of an electronic SIM, means that it can be activated for a short time in case of doubt, for instance if the group controller fails. Preferably the network compensates for the failure of one communication path and establishes a new one automatically and thus with a minimum delay. The new communication can be initiated through a corresponding request by the server or through a time-controlled inquiry and an attempt to access the provider network by the control module.

The server can then transmit information to the other control modules, making these control modules communicate with the new group controller during normal operation.

To signal successful commissioning/start-up, for instance successful integration of a control module into the group network or a successfully established contact with a server, to the operating personnel when a new light or a new control module is installed and/or after maintenance work on the respective light, the control module can operate the light at different brightness levels over predetermined or determinable time intervals once the desired state has been reached.

Preferably at least one control module receives a parameter set for operating the light from the server after initial installation and/or re-installation. This set may, for instance, consist of dimming curves.

Furthermore, operation of a network of lights is improved, if the control modules of a group are provided with software updates by a software transmitted from the server to the group controller. This may, for example, make new light functions possible or release them for use.

As an alternative, a control module may receive a new controller software, in particular firmware, directly from the server, by-passing the group controller. However, for this purpose the respective control module must first be reactivated with the provider.

To make detection of environment information by the short-distance network and communication in the short-distance network for purposes of the normal operation (communication with the server) more problem-free, it may be beneficial for the corresponding communication in the short-distance network to take place on different frequency bands of said network. Preferably the same antennae can be used for this (multiplex operation).

Figure 2:
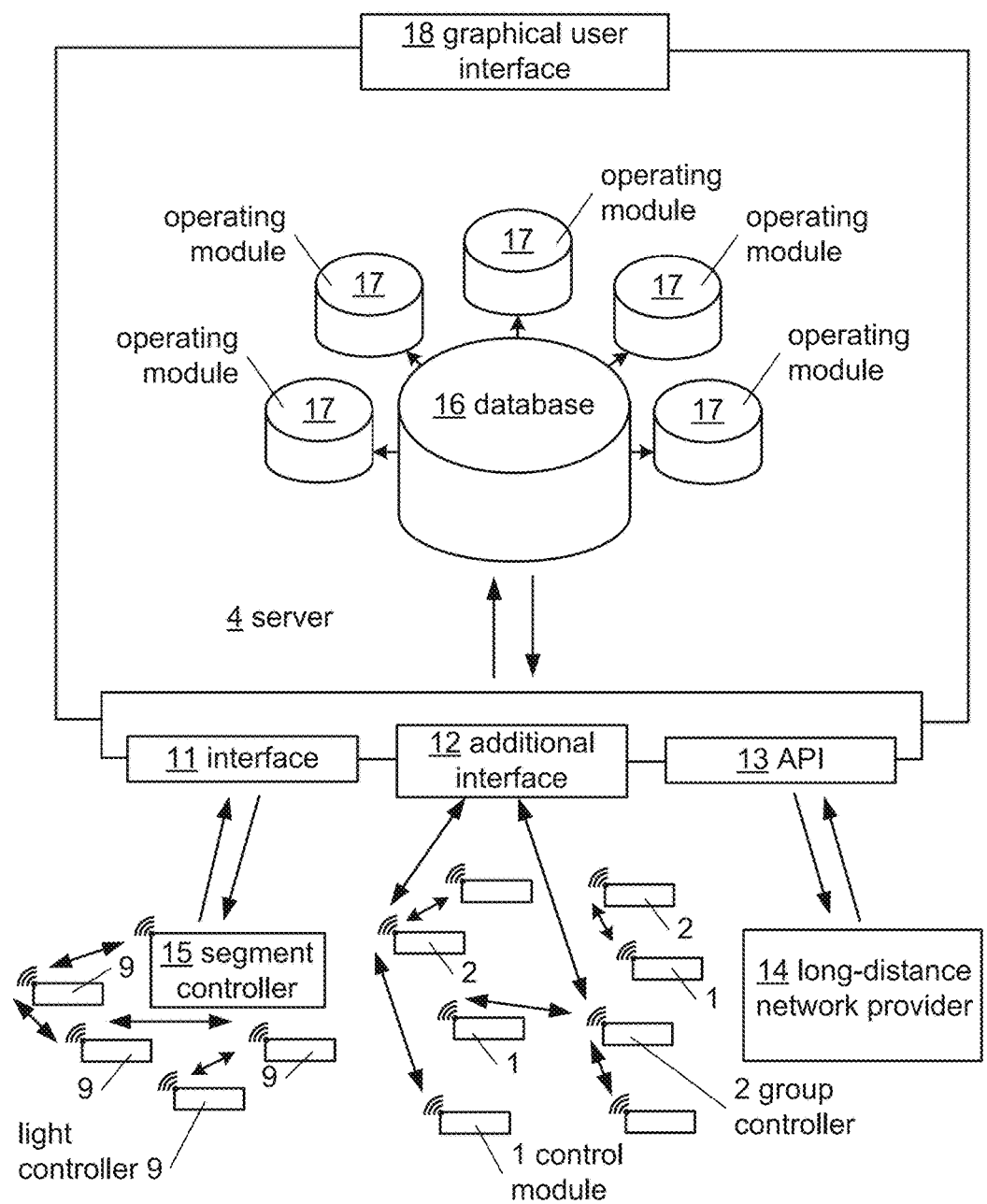

For further advantages and detailed features of the invention, refer to the following figure descriptions. The schematic figures show:
FIG. 1: a network according to this invention,
FIG. 2: a further object according to this invention,
FIG. 3: a simplified flow diagram for a process according to this invention,
FIG. 4: a further object according to this invention,
FIG. 5: a component of an object according to this invention,
FIG. 6: a further object according to this invention, and
FIG. 7: a component of an object according to this invention, according to FIG. 6

Individual technical features of the design examples described below can also be combined with design examples described above as well as the features of independent claims and potential further claims to form objects according to this invention. If this makes sense, functionally equivalent elements are given the same reference number.

The present invention comprises a network comprising a plurality of luminaires, each luminaire having a controller or control module for controlling the operation thereof, and a server. Each controller is connected over an GSM Modem or a low power radio network (LPRN) and decides how best they can communicate to the server. In a preferred embodiment, the controllers are able to form small networks with a group controller, the group controller having an active GSM modem which is shared within the small network and through which communication is made with the server over a provider GSM network.

As each controller communicates with the group controller, there is no need for more than one active GSM modem to be present in each small network with the advantage that costs can be reduced (GSM network costs). Each controller uses the LPRN to communication to its group controller using 6LoWAN using an IPv6 protocol. As a result, each small network comprises an internet protocol version 6 (IPv6) network and communication within the network is only using IPv6 protocols.

The server also operates using IPv6 protocols. However, to transmit information from each group controller to the server, a GSM network is needed and currently, these operate using internet protocol version 4 (IPv4) protocols. This means that communication between the group controller and the server needs to be converted from IPv6 to IPv4 for transmission over the GSM network and then converted back again at the server. In addition, the communication over the GSM network is encrypted and secure, the encryption being provided in accordance with a suitable encryption protocol.

The server can decipher the encrypted communications received from group controllers over the GSM network and can also encrypt communications for transmission to the group controllers over the GSM network. This provides an end-to-end encrypted communication between the group controllers and the server.

According to the method of this invention, FIG. 1 shows a multitude of control modules 1 being allocated to a group controller 2. The hardware of group controller 2 is identical to control modules 1. However, only the respective group controller 2 can use long-distance connection 3 to communicate with a server 4. Typically this is access to a local cellular network provider, through which the server can then remain accessible based on IP-WAN. Communication between the servers and group controllers can, for instance, be carried out via a common internet protocol (TCP/IP). As described above, this communication is using IPv6 protocol, and communication between the server and the group controllers involves tunnelling between IPv6 and IPv4 for transmission onto the GSM network, a communication using IPv4 over the GSM network, and a tunnelling between IPv4 and IPv6 at the server.

It will readily be understood that the requirement for the conversion/tunnelling between IPv6 and IPv4 and back again is due to the GSM network operating at IPv4. However, in the future, once the GSM network operates at IPv6, there will be no need for this conversion/tunnelling.

It will also be appreciated that in other embodiments of the present invention, the group controller and the server may operate on the same version of IP protocol as the GSM network.

Within a group 7, the control modules communicate with each other via short-distance connections 6. Preferably this communication should be based on on a mesh network on the IEEE 802.15.4 standard, for example ZigBee.

The individual groups 7 of control modules 1, 2 can generally not see each other and therefore cannot interfere with each other. However, for communication of several groups it may be intended for control modules with adjacent locations to use short-distance connection 8 to share/exchange or forward sensor data between groups. This can then be used to initiate actions such as an increase of the light volume. As an alternative, this communication may also use the corresponding group controllers 2, which can see each other through their IP addresses on the internet. The information regarding which control module may communicate with which other control module and how this module can communicate is defined on the server and carried out, for instance in case of short-distance communication between groups, in particular by means of a multiplex unit of each control module.

Furthermore, a server for operating a network according to this invention can control a state-of-the-art network with a segment controller 15 (FIG. 2) in addition to connecting to one or several groups 7 of control modules 1, 2, which form a PAN. This segment controller manages several light controllers 9. The segment controller 15 is connected via an interface 11, which makes data exchange with server 4 possible. In addition to a connection to several groups 7 via, if necessary, an additional interface 12, the server 4 can exchange data with a long-distance network provider 14 via another interface (API) 13.

In general, a database 16 runs on the server, interacting with different operating modules (clients) 17. A graphical user interface 18 grants the user access to the server and its programs for operation and control purposes.

Figure 3:
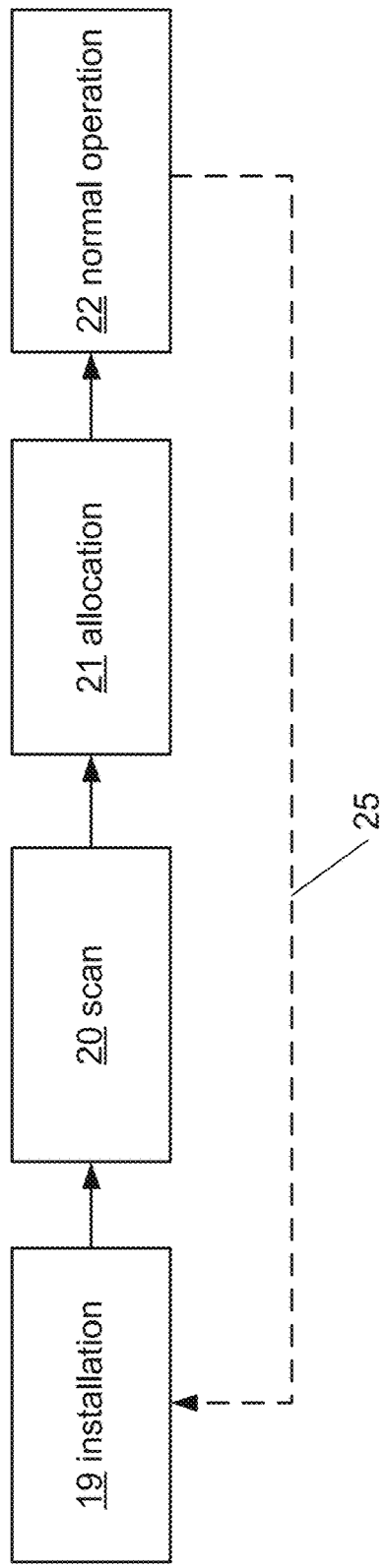

FIG. 3 briefly describes the process of setting up a network of street lights. After installation 19 of a number of control modules on street lights, these will scan their environment in phase 20 which is either started by the server or starts automatically. They then transmit environment information and possible light-specific or control module specific information to the server. This can take place either directly under roaming conditions with a first provider or, if necessary, with a local network provider determined by the server after the first log-in of the respective control modules. Once the environmental and other information has been transmitted by the respective control modules of the street light, an analysis of the control modules and allocation 21 into groups and determination of the group controller takes place. On the PAN level, set-up of the network can, for instance, be dynamic on the basis of the standard in use. Once the respective group controller has transmitted a data signal to the server, informing the server that the internal group communication has been successfully established, the system switches over to normal operation 22.

If additional control modules in a quantity pre-determined on the server have been installed, the process can be carried out again according to feedback loop 25.

Figure 4:
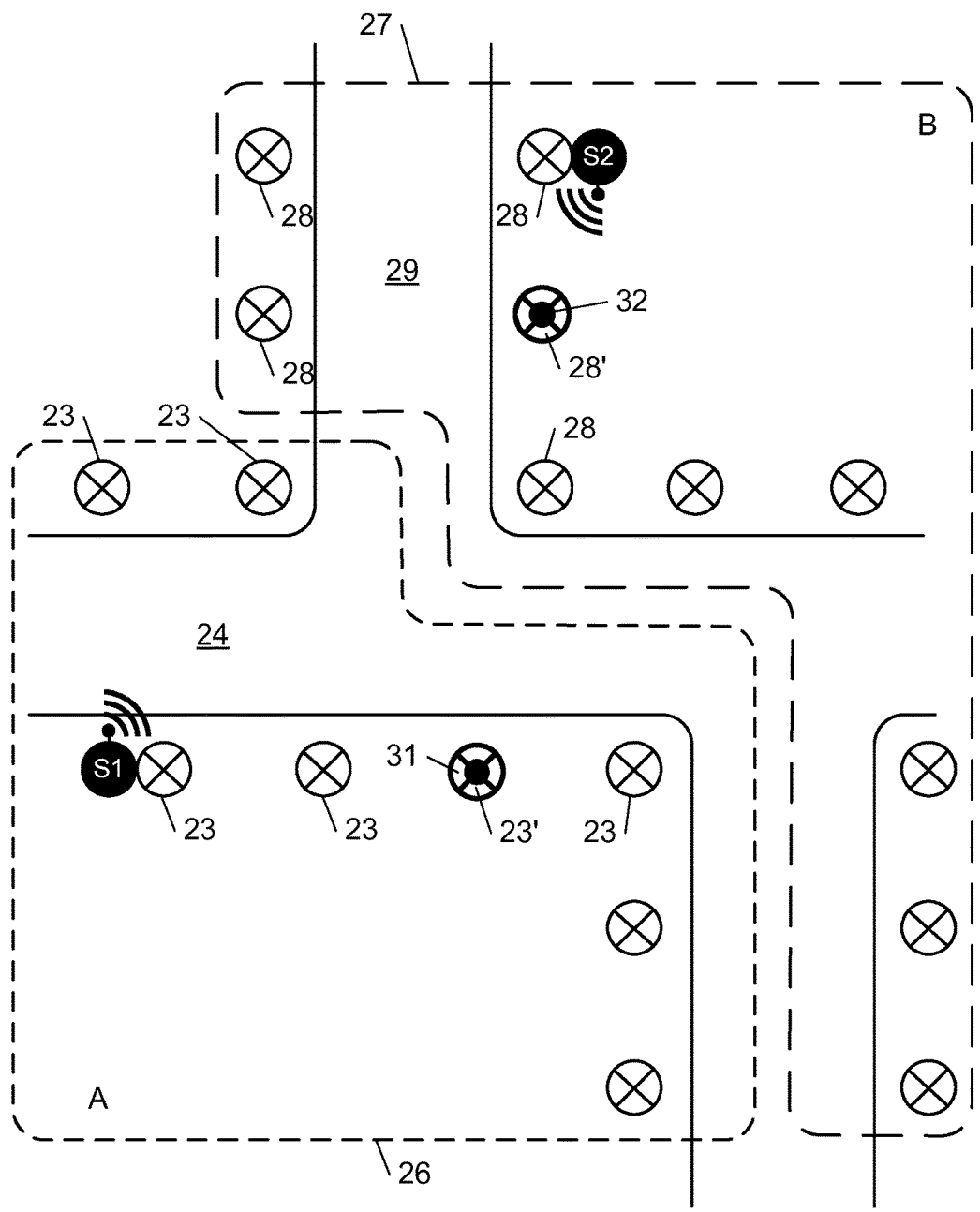
Figure 5:
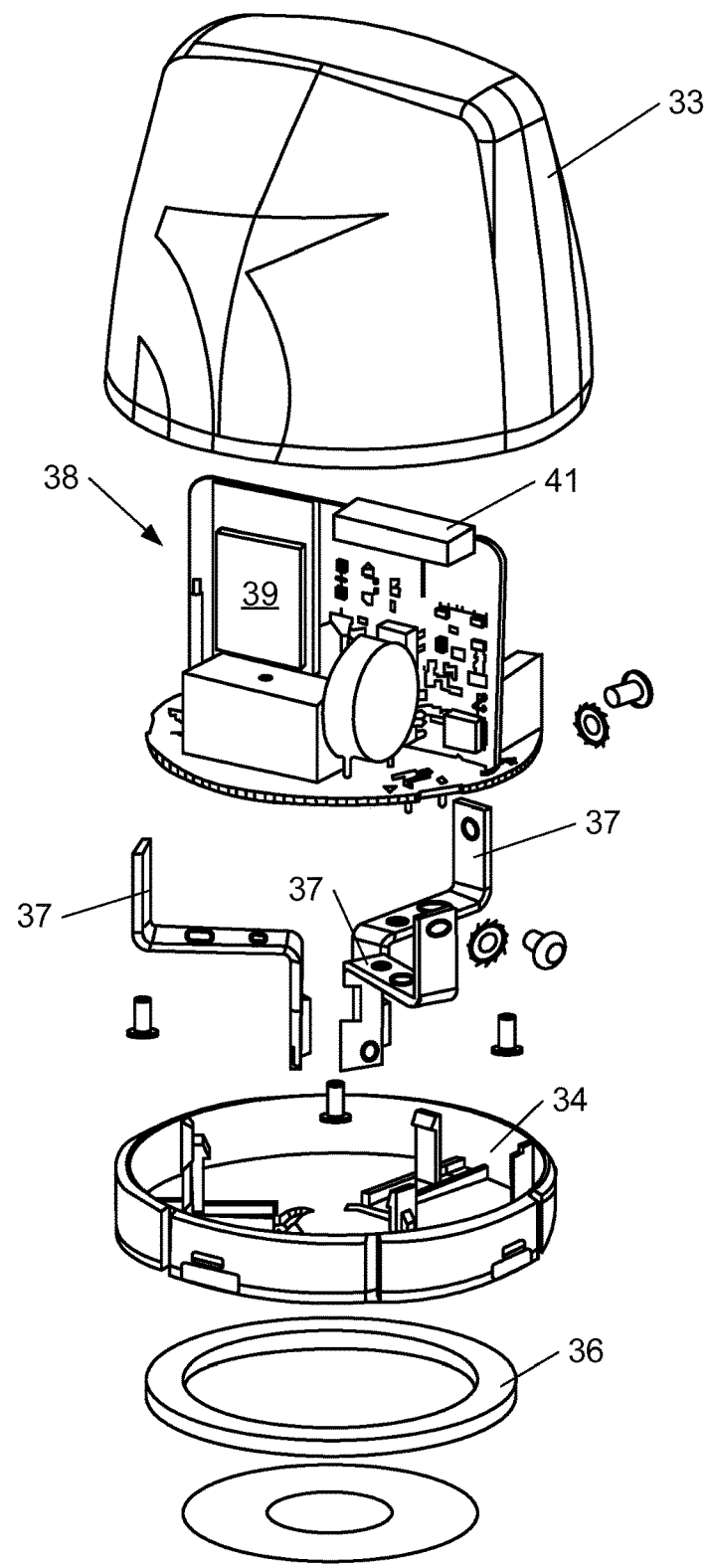

According to another design example of the invention according to FIG. 4, a number of lights with their respective control modules 23 and 23' are arranged along a street 24. These lights belong to a group of lights or control modules A, which was pre-determined on the server. Both group A and group B are marked by the broken lines 26 or 27. Group B contains lights with their corresponding control modules 28 or 28' which are placed alongside an intersecting street 29 leading into street 24. The inner black circles 31 and 32 mark a light with an active control module, a group controller. Sensors S1 and S2 are allocated to control module 23 and 28 respectively. As sensors, above all, radar sensors, infrared sensors (particularly passive infrared sensors) or induction loops in street 24 or 29 may be considered. These detect an approaching object, e.g. a vehicle, leading to the control modules both within a group and between groups adapting the light of the respective street light of the group to the situation.

For instance, sensor S1 of the control module 23 of street light detects an approaching object, e.g. a car, the information is shared within the group or part of the group and the light intensity of group A is increased by control modules 23 and 23'. Also this information or the information about the approaching car is transmitted via group controller 23' to the group controller 28' of group B. Subsequently, the brightness of the relevant lights of control modules 28 or 28', i.e. those selected by the server, is adjusted as well. As an alternative, the control module 23 equipped with sensor S1 can communicate directly with the group controller 28' of group B or another control module 28 allocated to this group controller, which means that this information is shared in the network and group B reacts accordingly.

Allocation of the respective control modules and therefore the corresponding street lights of a first group, which are to be provided with sensor information of an adjacent group's sensor and through which the information is then transmitted between groups, can be carried out on the server. Input masks are available for this purpose, particularly on the server.

Figure 7:
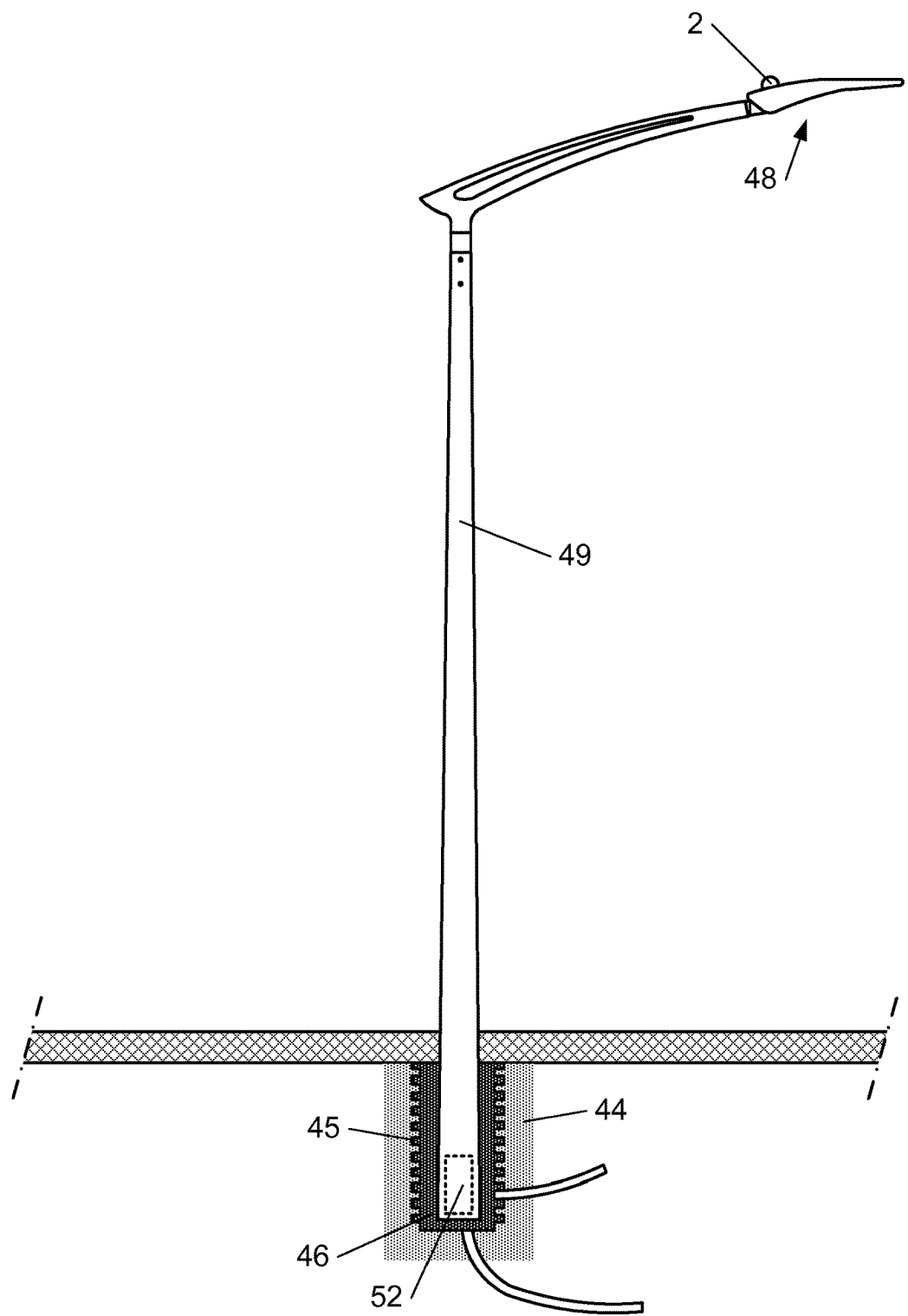

A control module according to this invention, which can be used to implement the method described above, is preferably designed as a separate unit, which can be installed on a light head, for instance of a street light (cf. FIG. 7). For further details regarding the crucial components of an externally installed control module, see FIG. 5. The exploded view of this figure comprises the control module, a top housing part 33 and a bottom housing part 34. The bottom housing part is to be fastened to a base fitted on top of the light by means of seal 36. The part is connected with the base through bayonet-type twisting contacts 37. These contacts 37 are fastened in housing 34 and also the location of the central circuit board unit 38. Among other things, a controller 39, short- and long-distance communication modules and an acceleration sensor unit 41 for detecting in particular seismic waves are located on this circuit board unit.

This figure does not show an RFID reader, which can be installed in a base on the light housing side in order to register light-specific data of an RFID transponder in the near field.

Figure 6:
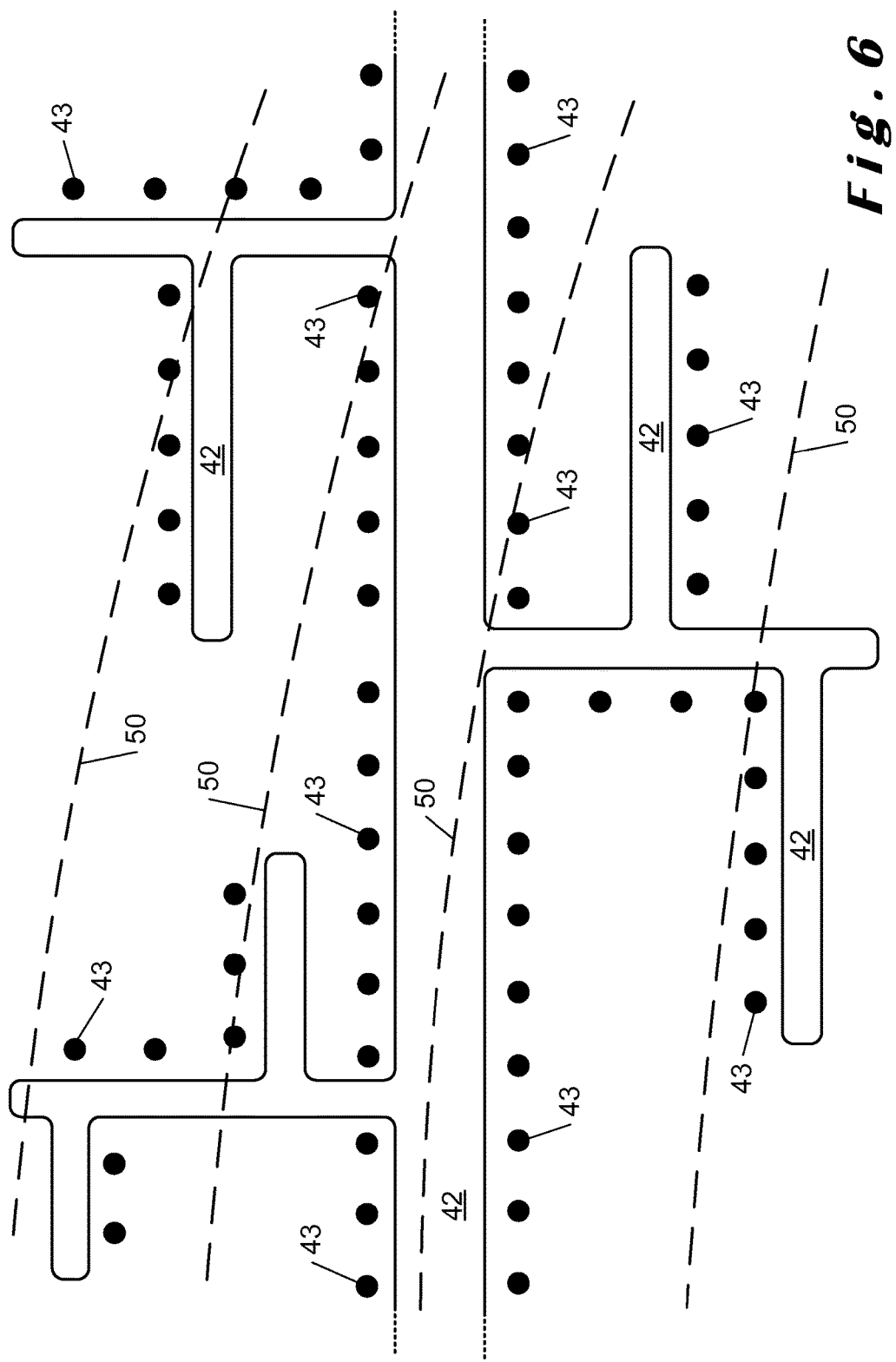

FIG. 6 shows a street network with multiple streets 42 with a length of several hundred meters. A multitude of street lights 43 with their respective control modules are placed alongside these streets. Each of the control modules is equipped with sensors for detecting seismic waves. These may be simple acceleration sensors. As an alternative, more sophisticated seismometers may be integrate in the street light. The data coming from the acceleration sensors, which are preferably integrated directly in the control module within the housing, can be transmitted to the server via the group controller and its long-distance communication module. Even if the sensors are relatively inaccurate, the high number of signals transmitted by them makes it possible to detect earthquake waves and analyse them on the server according to their location and time due to the geocoordinates transmitted by the control modules and the group controller. This means that even in case of a low resolution of the of the P and/or S waves a comparatively exact image of the course of the earthquake can be created. Information regarding the earthquake epicentre can be extracted from this information accordingly. This can either be carried out on the network server or on a special server allocated to an earthquake centre. Accordingly the lights can be controlled to be used as a subsequent tsunami warning or earthquake warning, for instance by sending out light signals which the population has been informed of beforehand. These may be wave-like light signals of alternating or propagating light intensity running along the street.

Due to the integration of a street light into the ground according to FIG. 7 and the fixed installation and connection of the light with the ground, for instance by means of a layer of lean concrete 44, a foundation pipe 45 or dense filling material 46, acceleration sensors located in or on the light head 48 in the control module can easily register the seismic waves propagating in the ground or along the surface via mast 49. As an alternative or in addition, a seismometer 52 with a higher resolution can be located in the foot of mast 49 and connected with control module 2 via a data line (not shown). A significant advantage of this system is that a large number of sensors distributed on a large surface can be evaluated almost simultaneously, making analysis for detection of the seismic waves 50, depicted as a broken line in FIG. 6, possible. At the same time, an information system is provided which can inform a multitude of road users at the same time.

The invention claimed is:

1. A network comprising:
   a server;
   one group of control modules or a multitude of groups of control modules, and
   a plurality of lights, each light being equipped with one of the control modules;
   each control module including a long-distance communication module configured for reaching the server, a short-distance communication module, a geo-coordinate module, and a controller;
   wherein each control module is configured for providing a control output to control a driver of the light and for transmitting, to the server, at least one of environmental, light, and control module information, wherein each group of control modules has one of the control modules specified as a group controller of said group, the group controller being configured for communication with the server via the long-distance communication module; control modules other than the group controller are configured for indirect communication with the server via their associated group controller, and within the group, each of the control modules is configured for communication with other ones of the control modules, including the group controller, via the short-distance communication module.

2. The network according to claim 1, wherein each control module further comprises a housing.

3. The network according to claim 1, wherein each control module further comprises a near field communication module.

4. The network according to claim 3, wherein the near field communication module comprises a RFID reader.

5. The network according to claim 1, wherein each control module further comprises a first part to be located outside of a light head and a second part to be located inside of the light head.

6. The network according to claim 1, wherein the short-distance communication module is designed for communication on multiple frequencies via an antenna.

7. The network according to claim 1, wherein each control module is factory-provided with log-in information.

8. The network according to claim 7, wherein the log-in information is stored in at least one of the controller and the long distance communication module, and is replaceable.

9. The network according to claim 1, wherein each control module further comprises an electronic subscriber identity/identification module (SIM).

10. The network according to claim 1, wherein each control module further comprises at least one sensor.

11. The network according to claim 10, wherein the at least one sensor comprises a brightness sensor.

12. The network according to claim 10, wherein the at least one sensor comprises an acceleration sensor.

13. The network according to claim 10, wherein the at least one sensor comprises a seismometer.

14. The network according to claim 1, wherein the light is a street light.

15. The network according to claim 1, wherein the server is equipped with an interface to a network provider, the interface being used to activate, suspend or deactivate communication with the long-distance communication modules of the plurality of control modules.

16. The network according to claim 1, wherein the group controllers have a unique internet protocol (IP) address and each group of control modules forms a separate personal area network.

17. A light comprising a light head and a control module; the control module comprises a long-distance communication module operable to reach a server, a short-distance communication module, a geo-coordinate module, and a controller; the light-head comprises a data medium storing light-specific data installed in or on the light head and being an RFID transponder; wherein the control module further comprises a near field communication module, which comprises a RFID reader able to read the RFID transponder, wherein the control module is configured for providing a control output to control a driver of the light and for transmitting, to the server, at least one of environmental, light, and control module information.

* * * * *